United States Patent
Roth

(10) Patent No.: US 10,622,177 B2
(45) Date of Patent: Apr. 14, 2020

(54) SWITCHING DEVICE

(71) Applicant: ELLENBERGER & POENSGEN GMBH, Altdorf (DE)

(72) Inventor: Herbert Roth, Altdorf (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 0 days.

(21) Appl. No.: 15/926,472

(22) Filed: Mar. 20, 2018

(65) Prior Publication Data

US 2018/0211804 A1    Jul. 26, 2018

Related U.S. Application Data

(63) Continuation of application No. PCT/EP2016/068463, filed on Aug. 2, 2016.

(30) Foreign Application Priority Data

Sep. 21, 2015  (DE) .................. 10 2015 218 108

(51) Int. Cl.
  *H01H 71/08*    (2006.01)
  *H01R 9/26*    (2006.01)
  *H02B 1/052*    (2006.01)

(52) U.S. Cl.
  CPC ......... *H01H 71/082* (2013.01); *H01R 9/2608* (2013.01); *H01R 9/2675* (2013.01); *H02B 1/0526* (2013.01)

(58) Field of Classification Search
  CPC .. H01H 71/082; H02B 1/0526; H01R 9/2608; H01R 9/2675

USPC ....... 361/605, 615, 616, 628, 629, 631, 632; 337/381; 439/110, 121, 532, 716
See application file for complete search history.

(56) References Cited

U.S. PATENT DOCUMENTS 4,171,861 A * 10/1979 Hohorst .............. H01R 4/4845
                                                              439/49
5,836,791 A * 11/1998 Waas .................. H01R 4/2433
                                                              439/709

(Continued)

FOREIGN PATENT DOCUMENTS

DE        29723752 U1   4/1999
DE   10 2011 087 209 A1   5/2013

(Continued)

*Primary Examiner* — Jayprakash N Gandhi
*Assistant Examiner* — Stephen S Sul
(74) *Attorney, Agent, or Firm* — Muncy, Geissler, Olds & Lowe, P.C.

(57) ABSTRACT

A switching device having a housing, with a cover that can pivot about a rotational axis, and a securing device for carrier rail mounting. The cover has at least one coupling contact for an electrical and/or signal-type contact connection with at least one engageable switching device. A closing or releasing of the contact connection occurs with a pivoting of the cover. A locking or unlocking of the securing device occurs with a pivoting of the cover. The securing device has a spring-elastic clipping element shaped on the housing, for force-locking securing to a carrier rail end face, and has a sliding element, which is mounted such that it can slide in a linear manner within the housing and is coupled to the cover, for interlocking securing to the carrier rail end face opposite the clipping element.

15 Claims, 5 Drawing Sheets

(56) References Cited

U.S. PATENT DOCUMENTS

| | | | |
|---|---|---|---|
| 6,551,111 B1* | 4/2003 | Watanabe | H01R 9/223 361/727 |
| 9,386,718 B2* | 7/2016 | Kusumi | H05K 7/14 |
| 2006/0121770 A1* | 6/2006 | Hammer | H01R 13/641 439/374 |
| 2008/0160838 A1 | 7/2008 | Adunka et al. | |
| 2008/0299820 A1* | 12/2008 | Schelonka | H01R 9/2608 439/532 |
| 2012/0045913 A1* | 2/2012 | Bodmann | H05K 7/1468 439/153 |
| 2012/0298490 A1* | 11/2012 | Buttner | H02B 1/052 200/303 |
| 2013/0027890 A1 | 1/2013 | Berger et al. | |
| 2015/0214656 A1* | 7/2015 | Izumi | H01R 13/629 439/62 |
| 2016/0248180 A1 | 8/2016 | Mickmann et al. | |
| 2016/0262274 A1* | 9/2016 | Molnar | H05K 5/0026 |
| 2016/0286666 A1* | 9/2016 | Mickmann | H02B 1/0523 |

FOREIGN PATENT DOCUMENTS

| | | |
|---|---|---|
| WO | WO 2006/027338 A1 | 3/2006 |
| WO | WO 2011/120881 A1 | 10/2011 |
| WO | WO 2015/059093 A1 | 4/2015 |

\* cited by examiner

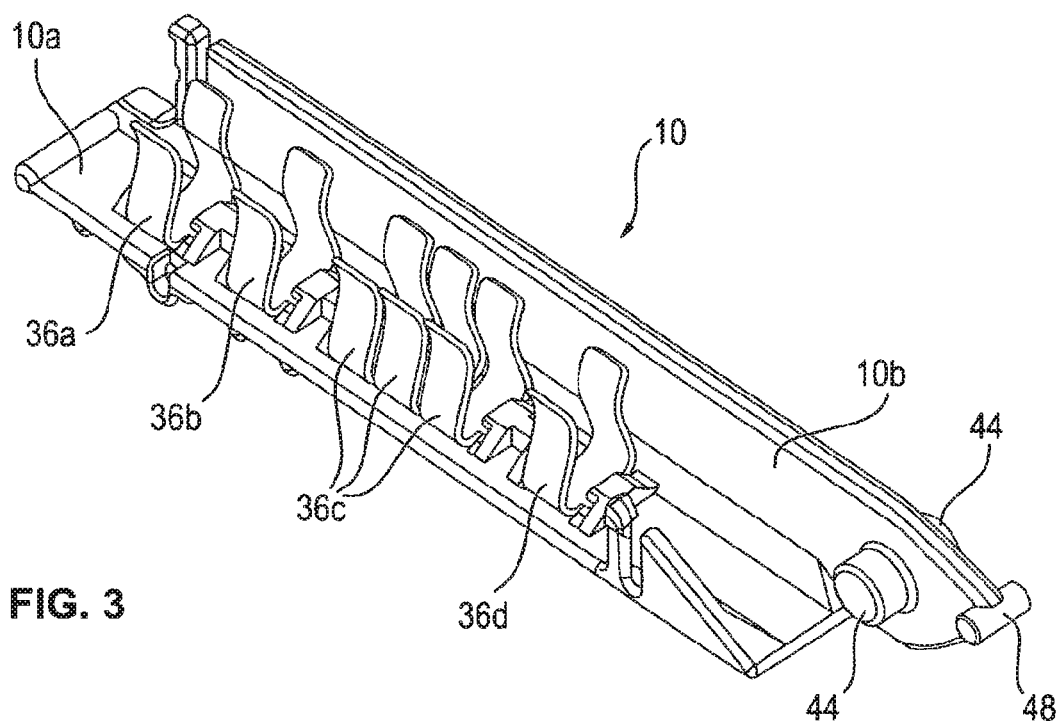
FIG. 3
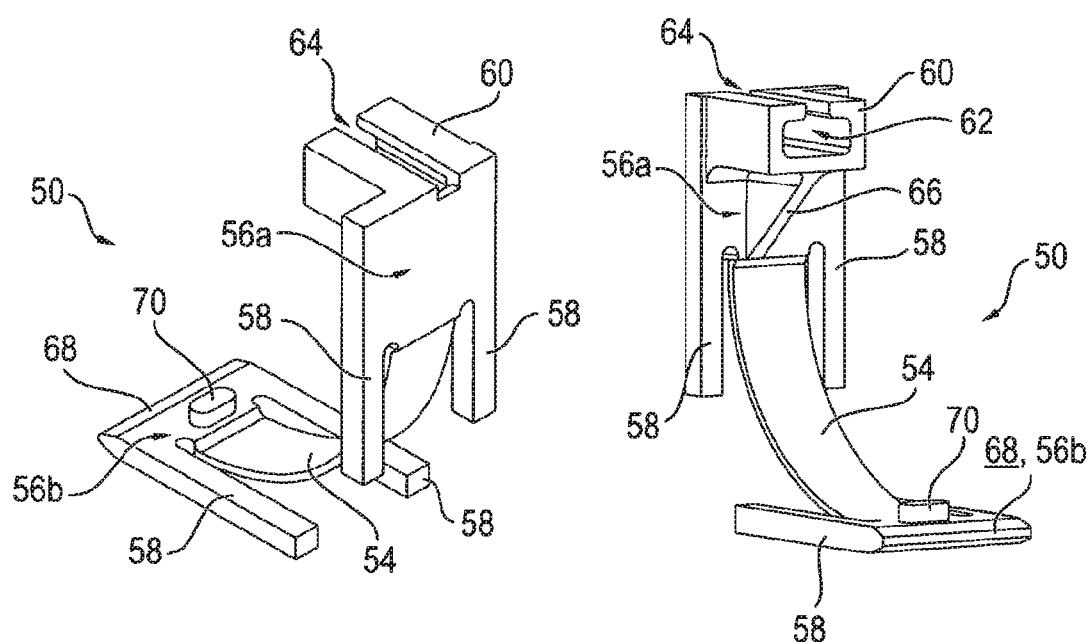
FIG. 4a
FIG. 4b

SWITCHING DEVICE

This nonprovisional application is a continuation of International Application No. PCT/EP2016/068463, which was filed on Aug. 2, 2016, and which claims priority to German Patent Application No. 10 2015 218 108.1, which was filed in Germany on Sep. 21, 2015, and which are both herein incorporated by reference.

BACKGROUND OF THE INVENTION

Field of the Invention

The present invention relates to a switching device, in particular in the form of an electrical switching device or a rail mounted device arranged in series.

Description of the Background Art

An electrical switching device, such as a mechanical, electronic or mechatronic circuit breaker, typically includes a supply terminal via which a network-side and thus the current-carrying main power line can be connected, and a load terminal, to which a load-side, outgoing power line can be connected.

As a switching device arrangement or current distribution system, hereinafter in particular an electrical installation is described having one or more electrical load circuits to which current is supplied from a common main power line and which are connected to a common current return. In other words, an electrical switching device which makes it possible to distribute the current supplied via a common main power line to a plurality of parallel load circuits is referred to as a current distributor. In this case, safeguards are provided which protect each load circuit individually against overload and/or short circuit.

Under such a current distributor, the switching devices are in particular provided at the junctions from which the load circuits branch off from the main power line. The switching devices are used here if needed to separate the respective associated load circuit from the live main.

Typically, internal wirings, for example for a signaling or BUS functionality, are provided in a sequence of individual switching devices. For this purpose, the switching devices used have integrated signals or coupling contacts, which pass through adjacent switching devices on the mutually facing end faces along a row direction.

As part of a current distributor, the switching devices can be typically mounted side by side as modular devices, directly on a carrier rail (top-hat rail). For this purpose, the switching devices have a securing device on the housing rear side that faces the carrier rail in the mounted state, for snapping and/or locking on the carrier rail. Conventional securing devices, for example, comprise a fixed (force-locking) holding geometry and/or a slidable (interlocking) holding geometry for releasable locking to the carrier rail. For actuating, such securing devices often have a manually operable actuating element with which at least one of the holding geometries can be brought into a locking or unlocking position.

However, a certain pivoting range is required above and/or below the carrier rail for the mounting or dismounting of such switching devices to place the switching devices on the carrier rail, or to again remove them therefrom. This, on the one hand, increases space requirements within a switch cabinet. On the other hand, especially in a mounting situation within a series connection of the current distributor, the problem may occur that the securing device or the actuating element coupled thereto is difficult to access or only accessible in a limited manner, so that the switching device may not be easily released from the series connection.

SUMMARY OF THE INVENTION

It is therefore an object of the invention to provide a particularly suitable switching device that can be arranged in series. The device is to be particularly user-friendly and easy to install as well as reliable in operation, particularly when it comes to separating the contact to adjacent switching devices and to releasing a securing device on a carrier rail.

For this purpose, the switching device comprises a housing with a housing cover that is pivotable about an axis of rotation, which is in particular fixed to the device or the housing, as well as a securing device for a direct mounting on a carrier rail such as a top-hat or G-rail. At a side facing the housing inner side, the cover has at least one electrical coupling contact for purposes of an electrical and/or signal-type contact connection with at least one switching device that is connected or connectable with its end face to the housing. A pivoting mechanism of the cover is designed such that at a rotating or pivoting of the cover, on the one hand a closing or releasing of the contact connection occurs, and on the other hand, substantially simultaneously a locking or unlocking of the securing device on the carrier rail takes place.

In particular in a mounting situation in the manner of a rail mounted device with a plurality of switching devices arranged in series, the lever-type cover acts both as a manually operable switch for the signal-type contact connection of the switching devices to each other and at the same time, as an actuating element of the respective securing device. By a pivoting of the cover, the respective switching device is thus releasable both from the carrier rail as well as selectively releasable with respect to its contact-connection with adjacent switching devices. This provides a particularly easy mounting/dismounting, for example for maintenance purposes. Furthermore, the pivotable cover provides an especially intuitive and simple actuating element for a user, rendering the switching device particularly user-friendly and easy to install.

For example, the pivoting mechanism can be configured such that with a closed cover, that is, in a pivoting state in which the cover substantially rests interlockingly against the housing, the contact connection is closed and the securing device is locked. When opening up or pivoting the cover open, wherein the cover is at least partially pivoted away from the housing, the contact connection is opened accordingly and the securing device is unlocked.

For the purpose of mounting the switching device on the carrier rail, the switching device can be fitted or snapped substantially perpendicular onto the carrier rail with an open cover, i.e., a cover that is pivoted open. Subsequently, the cover is pivoted to the closed position. The securing device is thereby actuated so that the switching device is preferably held interlockingly to the carrier rail. For dismantling, the cover is opened accordingly, thus unlocking the securing device, whereby lastly the switching device can be substantially perpendicularly removed from the carrier rail.

As part of its design as a rail mounted device, the switching device has a profiled receptacle (receiving slot), for example, located on the housing rear side, that is, on the housing narrow side facing the carrier rail in the mounted state. The securing device is suitably arranged in the region of the receptacle and at least partially surrounds the carrier rail in the mounted (locked) state so that the carrier rail is held reliably between the securing device and the receptacle.

The housing end face narrow side thus faces the user in the intended mounting position of the switching device. The profile direction of the receptacle (and the corresponding carrier rail thereto) defines a row direction (carrier rail longitudinal direction) along which a plurality of switching devices can be arranged in series in the mounted state. The housing sides oriented substantially perpendicular to this row direction are hereinafter referred to as (housing) end faces. The other two housing narrow sides are hereinafter referred to as (housing) top or (housing) bottom, in accordance with the intended mounting position of the switching devices.

The cover is formed as a contact carrier for the coupling contacts, preferably designed as two-legged spring contacts in the manner of a clamping contact. In a suitable embodiment, the cover has, for example, a substantially cylinder-like bearing pin in the region of the axis of rotation, which in the mounted state engages or rotatably rests in hollow cylinder-like bearing positions (bushings) of the housing. The reverse arrangement of the bearing pins and bushings is generally also possible.

For the purpose of a simple contact-connection of adjacent protective devices, the cover is preferably arranged at the end face, that is, the cover is arranged offset to an end face with respect to a center plane disposed between the (housing) end faces, so that the cover projects beyond the respective housing at least partially on the end face. On the opposite end face, the housing has corresponding (joining) receptacles on the top, so that with a closed cover, the coupling contacts are electrically conductively contacted both with counter-contacts of the protective device and with counter-contacts of a respectively connected protective device.

In other words, the cover engages or the coupling contacts engage in the closed or folded-shut (retracted or swung-in) state at least partially in both the housing and in the respective housing of the adjacent protective device that is arranged in series. This means that a first contact leg of the contact spring is in contact with a device internal counter-contact, and that a second contact leg of the contact spring is in contact with a counter-contact of the adjacent switching device. The coupling contacts of the cover thus act in the manner of a conductor bridge between adjacent protective devices, so that in a current distributor, the housings are interspersed electroconductively along the row direction or the carrier rail longitudinal direction in a series connection.

In a series connection, the switching device outermost on the end face can be coupled to a supply for connection to a network side and thus a current-carrying power line. By means of the housing internal contacting, the power is thus guided safely so that it is shielded against contact.

Furthermore, virtually any number of switching devices can be arranged in series without providing busbar joints or cable connections of different lengths. Further, for the switching devices to make contact amongst each other or with each other, no threaded contact connections are required, whereby mounting and dismounting of the switching devices is further simplified.

The housings of the switching devices arranged in series can therefore advantageously be designed closed and without contact connection between their housing sides positioned next to one another in the series arrangement. As a result, clarity with respect to wiring and connection of several load circuits in a current distributor thus formed is improved.

The switching device can be configured as a circuit breaker for protecting a load circuit. A circuit breaker can be understood to be, for example, a thermal, thermal-magnetic and electronic device circuit breaker, a switching relay or an overcurrent protective device, which comprise electronics within the housing. For this purpose, the switching device can have on the housing front side at least one (load) terminal for a load circuit, wherein an actuatable switching device is preferably arranged between the counter contact coupled to the supply and the load terminal. This way, a connected load circuit is simultaneously disconnected from the power supply upon opening of the cover.

The (device) electronics is preferably suitable and configured to actuate the switching mechanism of the switching device in response to a switching signal. For this purpose, the pivoting mechanism of the cover has at least one coupling contact, which is provided preferably to selectively open and close a contact connection for guiding the switching signal. The corresponding power and/or signal routing connection is suitably bi-directional and can also be embodied as a data or signal bus.

In an embodiment, the axis of rotation of the cover in the mounted state is oriented substantially parallel to the carrier rail and located near a housing narrow side on the side facing the rear of the carrier rail. The axis of rotation is preferably positioned near a corner portion of the device or housing top. The cover thus essentially forms a cover for the device or housing top so that these are easily accessible and can be pivoted by a user even in a mounting position within a series arrangement in a switch cabinet.

For fixing on the carrier ran, the securing device comprises a spring-elastic clipping element that is integrally formed on the housing, as well as a slide element which is mounted such that it can slide in a linear manner within the housing. In the mounted state, the switching device is reliably and interlockingly held by means of the clipping element on a carrier rail end face. The slide element is linearly slidably coupled to the cover by means of the pivoting mechanism.

With the cover closed, the slide element is preferably shifted into the region of the rear housing receptacle in such a manner that it engages at least partially, in particular interlockingly, behind the carrier rail on the carrier rail end face situated opposite the clipping element. In other words, in the mounted state, the carrier rail is thus embraced or engaged from behind by both (carrier rail) end faces by means of the securing device.

The securing device thus comprises two mutually independent holding geometries, wherein a functional separation between the force-locking snapping/locking of the clipping element and the interlocking locking or unlocking of the slide element is realized.

For mounting, the switching device is set substantially perpendicularly on the carrier rail with the cover open, i.e., pivoted open, wherein the spring-elastic clipping element is engaged with or clipped to the carrier rail end face. By the pivoting of the cover, the slide element is then moved into the locking position, so that the switching device is secured in an interlocking and force-locking manner on the end faces of the carrier rail.

For dismantling, the cover is opened and the housing of the switching device is pivoted, for example, away from the clipping element so that the carrier rail is released from the force fit. In the case of a crowded mounting situation where there is insufficient space for pivoting the housing, in an advantageous embodiment the clipping element is coupled to the housing underside (i.e., the side of the housing that is opposite the cover) with an actuatable housing recess, wherein by means of the housing recess, the force-locking attachment to the carrier rail end face is releasable.

For this purpose, the housing recess can be integrally formed on the clipping element and/or on the housing in such a manner that one side wall of the housing recess is actuatable or bendable, wherein upon actuation of the side wall, the clipping element is pivoted lever-like into a position which opens the frictional connection. When the cover is folded open, the switching device can thus be substantially vertically removed from the carrier rail upon actuation of the housing recess. This allows for both particularly simple mounting and very simple and user-friendly dismounting of the switching device.

In an embodiment, the housing recess can be designed to receive a tool, in particular to receive a screwdriver head. This way, even in a mounting situation with limited internal space, in particular in a rail mounted device within a switch cabinet, the clipping element is easily released.

In an embodiment, the cover is coupled to the narrow side of the rotational axis side with a spring-elastic deflection element, in particular in the manner of a swivel-sliding joint. This way, the pivoting movement of the cover is converted into a linear movement of the slide element that is transverse to the pivoting direction and the carrier rail longitudinal direction, that is, in a direction oriented substantially perpendicularly to the carrier rail end face. Thus, a particularly simple locking or unlocking of the securing device is realized.

In an development, in particular, the deflection element can have a substantially arc-like leaf spring element, wherein the slide element is arranged tangentially in alignment on a carrier rail-side end of the leaf spring element. In a particularly preferred embodiment, the leaf spring element here in particular lies within the housing between two complementary shaped arc-like inner walls that function as a slipping-off or sliding guide. The inner walls are arranged in a corner region associated with the rotational axis, i.e., in particular the upper rear corner region, and are spaced radially from each other, wherein the leaf spring element rests slidably in the region of its arc-like bulge between the inner walls.

When opening or unfolding the cover, an actuating force is exerted in the direction of the carrier rail on the cover-side end of the leaf spring element. By the leaf spring element sliding between and along the inner walls, the actuating force is deflected by approximately 90°, thereby pressing or pushing the slide element out of the housing into the locking position.

When closing or snapping the valve shut, the leaf spring element is correspondingly moved in the opposite direction, whereby the slide element is at least partially drawn or dragged along into the housing into an unlocking position.

At a pivoting of the cover, the leaf spring element is thus not, or hardly, compressed or stretched since the inner walls advantageously delimit a force-consuming deformation of the leaf spring element. Instead, the bending elasticity is rather used for the leaf spring element to evade the actuating force by slipping or sliding along the inner walls in the course of the force and movement deflection.

Thus, the slide element is not urged into a locking or unlocking position by a spring tension of the leaf spring element. At a pivoting of the cover, the spring tension thus does not need to be additionally overcome, whereby the cover is particularly easily pivotable in both directions. The securing device is therefore always easily actuated, thus ensuring both a simple locking and a simple unlocking on the carrier rail.

In the locked state, the closed cover blocks a displacement of the slide element so that a particularly vibration-free and operationally secure hold is ensured on the carrier rail. This way, neither in the locked or unlocked state do any appreciable spring, torsion or bending forces act on the leaf spring element, which has an advantageous effect on the durability of the leaf spring element and thus the durability of the protective device.

In an embodiment, the cover has a guide pin on the narrow side of the rotational axis-side, which is disposed within a groove-like profile chamber of the deflection element. The guide pin is preferably designed with a roller-like head portion, the head portion preferably interlockingly resting within the profile chamber. The substantially rectangular profile chamber suitably comprises an elongated profile slot through which the cover, or a shaft portion of the cover coupled to the head portion is at least partially guided. This way, a substantially roller-joint type coupling is realized between the cover and the leaf spring element.

In an embodiment, the profile chamber is arranged substantially perpendicular to the slide element at the end of the leaf spring element, facing away from the slide element. For the purpose of an improved force transmission of the pivotal (rotating) movement of the cover into the linear movement of the slide element, the profile chamber has a leaf-spring-side, wedge-like strut which supports the profile chamber against the leaf spring element.

In an embodiment, the axis of rotation of the cover is arranged as a rotational or pivotal point between the guide pin and the at least one coupling contact. The guide pin is arranged in particular on the load-arm side of the rotational axis, wherein the at least one coupling contact is positioned on the force-arm side thereof. Preferably, the cover has a greater length on the force-arm side so that a lever is realized that is as large and easily pivotable as possible. This means that the rotational axis is not disposed directly in the rear upper corner region of the housing, but instead is offset toward the housing front side by about the height of the deflection element. This ensures a particularly simple actuation of the securing device.

The pivotally mounted cover can thus generate a comparatively large torque with relatively low force. By means of the deflection element, the force arm movement of the cover is converted into the linear movement of the slide element for locking or unlocking. Consequently, when a cover is closed, on the one hand a more reliable and vibration resistant interlocking fit on the carrier rail is made possible. On the other hand, it is ensured that the interlocking fit is particularly easily released or unlocked when required.

Upon closing the cover, the guide pin is pivoted in the shape of a circular segment. By the roller-head-like placement within the profile chamber, the head portion hereby presses the profile chamber in the direction substantially perpendicular to the carrier rail. The profile chamber is then pressed to the housing rear side and thereby acts on the leaf spring element, which in turn interlocks with the carrier rail by sliding or slipping along the inner walls of the slide element.

Accordingly, the guide pin is pivoted in the opposite direction in the shape of a circular segment upon opening the cover. This results in the profile chamber being 'pulled up', so to speak, by a distance proportional to the pivot angle of the cover in the direction of the housing front side, whereby the leaf spring element and thus the slide element are entrained into an unlocking position.

In an embodiment, the slide element and the profile chamber each have a substantially U-shaped guide extension on the leaf spring side. The vertical U-legs of the guide extensions are in this case can be aligned such that they are each oriented tangentially to the leaf spring element in the direction of the corner region, wherein the leaf spring element is attached in each case to the horizontal U-leg in the inner region of the vertical U-legs.

The vertical U-legs serve in particular as a linear guide in corresponding groove-like receptacles in the housing interior. Consequently, on the one hand the profile chamber is substantially slidable only in a direction substantially perpendicular to the carrier rail, and on the other hand the slide element is substantially only slidable in a direction perpendicular or substantially perpendicular to the carrier rail end face. By the linearly slidable mounting by means of the vertical U-legs it is ensured that the leaf spring element glides (slides/slips) along the inner walls for force and movement displacement and is not compressed or bent in a force-consuming manner.

For this purpose, in an embodiment, the groove-like receptacles for the linear bearing of the vertical U-legs are formed by an intermediate region between the housing and the housing-side inner wall. A particularly stable mounting of the guide extensions is thus ensured.

In a suitable design, the horizontal U-leg of the slide element-side guide extension has a knob-like stop element which limits the linear movement of the slide element in the direction of the carrier rail front side upon closing the cover by abutment on a housing wall.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein: an exemplary embodiment of the invention is explained in more detail with reference to a drawing. The drawing shows:

FIG. 3 illustrates the cover in a perspective view;

FIGS. 4a and 4b illustrate the deflection element in different perspective views.

DETAILED DESCRIPTION

Figure 1:
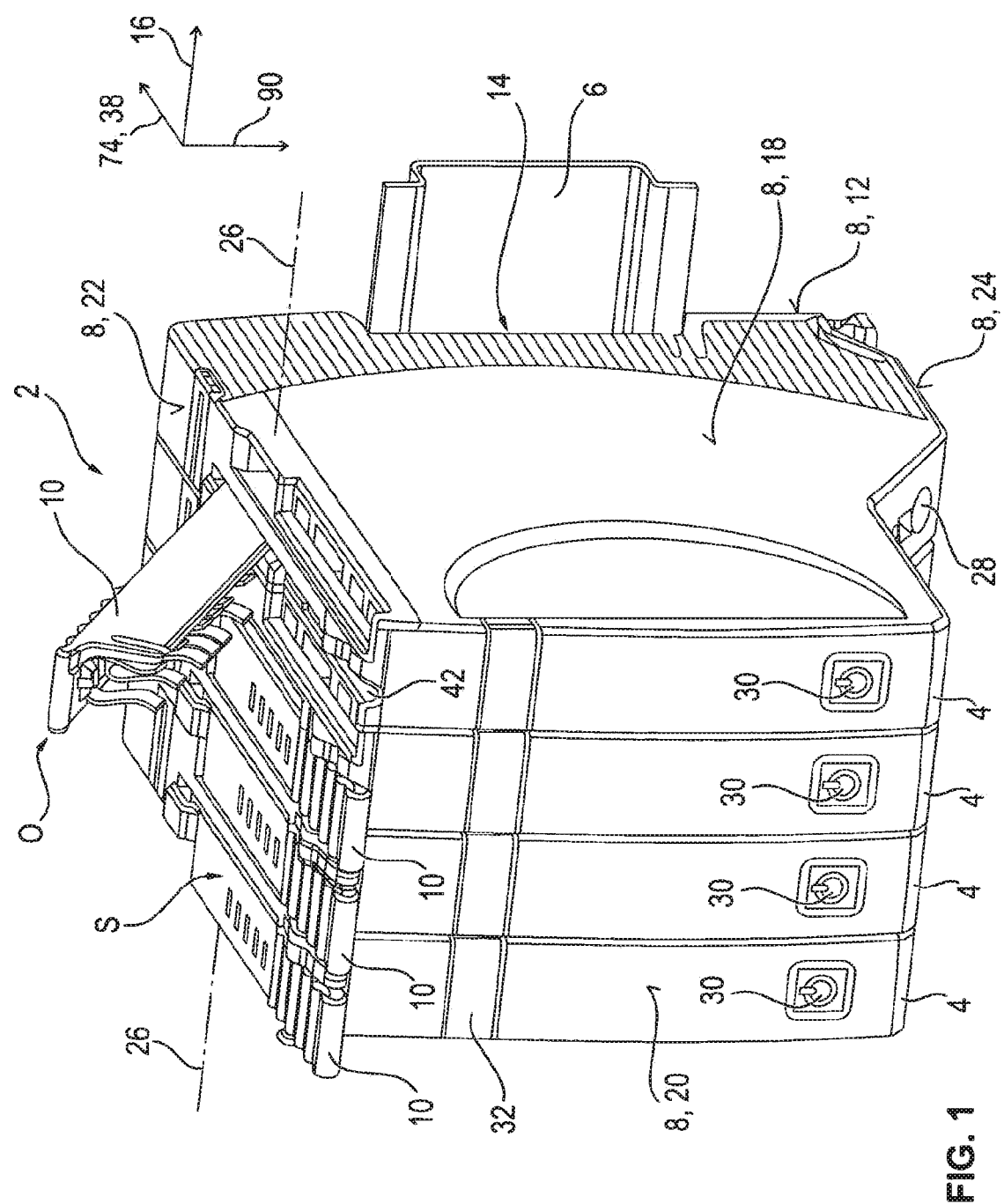
FIG. 1 is a perspective view of a current distributor with four protective devices arranged in series.

The current distributor 2 shown in FIG. 1 comprises four protective devices 4, which are arranged in series and mounted on a carrier rail 6. Each switching device 4 comprises a separate, i.e., separated from the other switching devices 4, housing 8 with a pivotable (housing) cover 10. The housing 8 and the cover 10 are preferably made of an insulating material. The switching devices 4 are designed in the manner of a rail mounted device, and accordingly have a groove-like receptacle 14 at a respective rear side of the housing 12, with which for mounting purposes the respective protective device 4 can be placed on the carrier rail 6.

The profile direction of this receptacle 14—and, accordingly, in the mounted state, the profile direction of the carrier rail 6 corresponding to this receptacle 14—define a row direction (carrier rail longitudinal direction) 16 along which the switching devices 4 are arranged in series. The housing surfaces of each switching device 4 situated opposite one another in the row direction 16 are hereinafter referred to as (housing) end faces 18 of the respective switching device 4.

The housing side opposite the housing rear side 12 of each switching device 4 is referred to as the (housing) front side 20 of the switching device 4, This front side 20 faces the user when the current distributor 2 is mounted in a switch cabinet. The two remaining sides of the housing of each switching device 4—according to the conventional mounting position of the switching device 4—are referred to as the (housing) top 22 or the (housing) bottom 24, regardless of their actual position in the surrounding space.

The cover 10 forms a contacting and pivoting mechanism side of the housing 8 and is disposed on the top 22. The cover 10 is pivotally mounted about a rotational axis 26, wherein the axis of rotation 26 is oriented parallel to the row direction 16.

For supplying a current, the current distributor 2 comprises a not-shown supply device, which, for example, is connected to a flexible wire conductor or stranded conductor by means of a screw clamp or cutting clamp for carrying current. The contact connection of all switching devices 4 with this supply device is effected by means of the covers 6 of each switching device 4. For this purpose, the covers 10 are designed as contact carriers and are suitable and configured for opening and closing the respective contact connection between two associated switching devices 4 by means of the contacting and pivoting mechanism.

The (housing) front side 20 of the switching device 4 has a load output 28 and an operable switch 30. A supply line of a load circuit (or consumer power circuit) can be connected to the load output 28. The load output 28 for this purpose comprises a terminal, which, for example, is also designed as a screw clamp or cutting clamp. Inside the housing 8, the load output 28 and a contact connection of the cover 10 coupled with the supply module are interconnected via a switching device and/or via a device electronics comprising a circuit board.

The respective electrically, electromechanically, or electronically embodied switching device may realize a circuit breaker function, for example, against overload, short circuit and/or current limit in order to separate the current path formed between the supply module and the load output 28 in the event of an overcurrent, According to the conventional technology, the switching device may be based on a magnetic, thermal, electronic and/or pneumatic operating principle. Preferably, the switch 30 has in this case a multi-colored LED as a display element with which the operating state of the switching device is visually indicated to a user.

Figure 2:
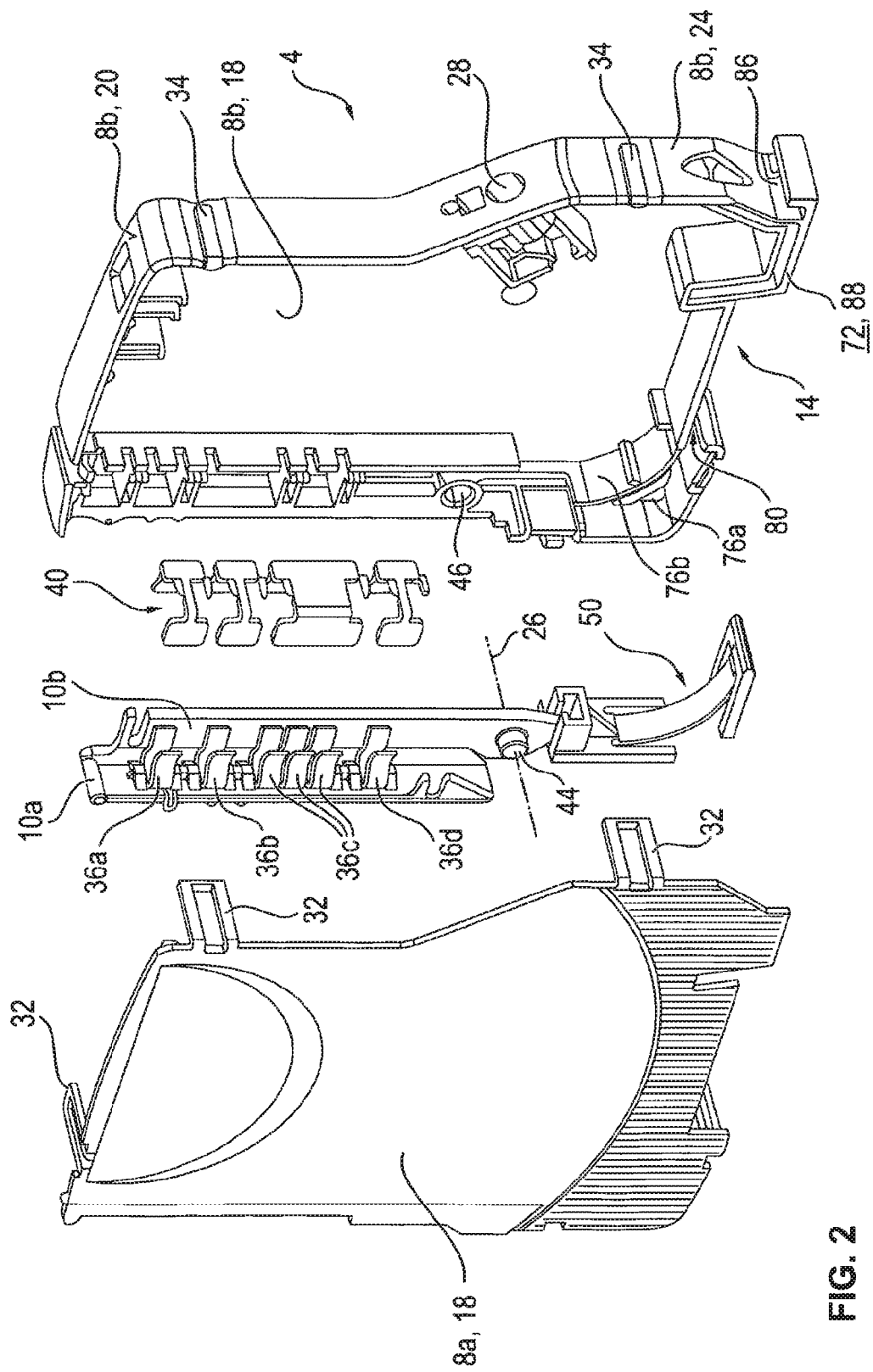
FIG. 2 is an exploded view of a protective device with a cover and with a deflection element coupled with the cover.

FIG. 2 shows the switching device 4 in an exploded view, in the dismounted state. The housing 8 basically comprises two housing halves 8a, 8b, which are mounted to form a closed housing 8 by means of dipping elements 32, 34. The cover-like housing half 8a in this case forms the end face 18, wherein the shell-like housing half 8b includes the opposing end face 18 as well as the rest of the housing sides 12, 20, 22 and 24.

The dipping elements 32 are designed as substantially eye-like dipping tabs 32 which oppose the housing half 8a in the direction of the housing half 8b. The dipping tabs 32 are circumferentially arranged on the housing half 8a and enclose complementary latching pins 34 in the mounted state, which are arranged accordingly on the housing sides 12, 20, 22 and 24 of the housing half 8b.

As can be seen in particular in FIG. 3, in the exemplary embodiment the cover 10 carries a plurality of coupling contacts 36a, 36b, 36c, 36d. These are arranged in series or side by side in the pivoted shut or closed position (engaging position) S shown in FIG. 1, on one of the switching devices 4 in the transverse direction 38 extending transversely to the row direction 16. In one of the switching devices 4 shown in FIG. 1, the cover 10 is in a pivoted open or open position (disengaging position) O.

The coupling contacts 36a, 36b, 36c, 36d serve for conducting electricity or for signal guidance or signal current guidance and are suitably designed as two-legged spring contacts. The spring legs of the latter have bulges that face one another and are outwardly crimped at their free end. This facilitates or improves the contact between the coupling contacts 36a, 36b, 36c, 36d in the course of an engagement process in the contacting direction in the manner of an insertion aid for reliable contacting with device-internal counter contacts 40.

The device-internal counter contacts 40 are substantially U-shaped, wherein in each case in the course of contacting, one of the U-legs engages in a contacting manner with one of the spring legs of the coupling contacts 36a, 36b, 36c, 36d, while the other U-leg engages in a contacting manner with the other spring leg of the respective coupling contact 36a, 36b, 36c, 36d of the adjacent switching device 4. In this way, the contact connections between the switching devices 4 arranged in series are generated. The counter contacts 40 are coupled in a non-illustrated manner with the device-internal device electronics and the switching device.

The respective cover 10 is formed as a cross-sectionally L-shaped plastic part. One of the L-legs (cover legs) 10a bears the coupling contacts 36a, 36b, 36c, 36d on the inside and practically forms a cover plate for closing the contact side (top 22 of the housing 8) of the respective switching device 4. This cover leg 10a, being the cover plate, also partially engages with the switching device 4 situated adjacent in the current distributor 2. The other (second) L-leg 10b of the cover 10 extends substantially perpendicular to the other (first) L or cover leg 10a and is suitably formed on this. With this further L or cover leg 10b, in the closing and contact state or in the corresponding position S, the cover 10 engages in a housing slot 42 of the respective housing 8 of the switching device 4.

Bearing pins 44, which engage in corresponding bushings 46 of the housing halves 8a, 8b at their respective end face inner side, are integrally formed on the L or cover leg 10b, which is effective as an engagement part, to form the axis of rotation 26. Alternatively, the bearing pins 44 can also be integrally formed on the inside of the housing halves 8a, 8b in a kinematic reversal, while the bushings 46 are then provided correspondingly on the cover 10 and there, on their cover legs 10b serving as the engaging part.

The cover leg 10b has at its end on the housing rear side a roller-type guide pin 48, which—as indicated in FIG. 2—is operatively connected with a deflection element 50 of a securing device 52.

The deflection element 50 shown in FIGS. 4a and 4b has a substantially arc-like spring-elastic leaf spring element 54, which is at least partially surrounded in each case on both ends of a U-shaped guide extension 56a, 56b. To this end, the respective vertical U-legs 58 of the guide extensions 56a, 56b are disposed tangentially to the leaf spring element 54. The guide extensions 56a, 56b are mounted on the leaf spring element 54 in the region of the horizontal U-legs, inside the vertical U-legs 58. Thereby, the vertical U-legs 58 of the guide extensions 56a, 56b are oriented substantially perpendicular to each other.

In the region of the horizontal U-leg, the cover-side guide extension 56a has an integrally formed profile chamber 60 which projects beyond the guide extension 56a to the guide extension 56b. The profile chamber 60 includes a groove-like receptacle 62 for the guide pin 48 of the cover 10. The receptacle 62 receives the guide pin 48 in cross-section in a substantially interlocking manner, wherein the cover leg 10b is at least partially guided through a cover-side profile slot 64 of the profile chamber 60 so that the guide pin 48 is mounted linearly slidable within the receptacle 62. The profile chamber 60 has a wedge-like strut 66 for support against the horizontal U-leg. The strut 66 is disposed flush against the profile slot 64 on the profile chamber 60.

The horizontal U-leg of the guide extension 56b is designed as a slide element 68, wherein a stopper element 70 is integrally formed on the slide element 68 which projects beyond guide extension 56b to guide extension 56a.

In reference to FIGS. 5a and 5b, the securing device 52 of the switching device 4 is explained in more detail below. The figures show the switching device 4 in sectional views, with a view to the inside of the housing half 8b.

Figure 5A:
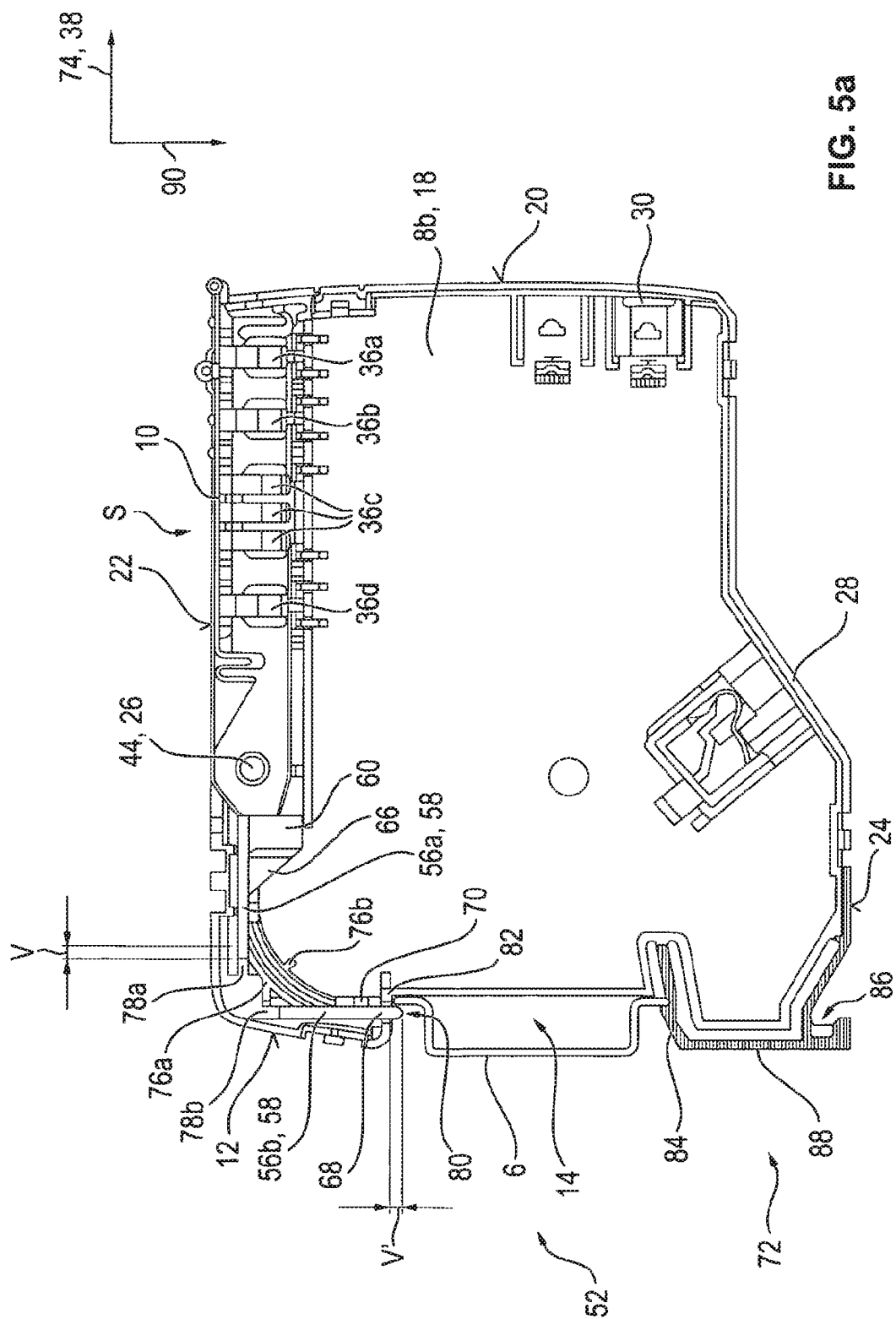
FIGS. 5a and 5b illustrate, in sectional representation, the protective device with a pivotable cover and with the deflecting element coupled thereto for various cover positions.

FIG. 5a shows the switching device 4 in a mounted state on the carrier rail 6. For this purpose, the switching device 4 has the securing device 52 in the region of the receptacle 14, with which the switching device 4 is held interlockingly and force-lockingly on the carrier rail 6. The securing device 52 comprises both the slide element 68, which can be actuated by means of the cover 10, and a spring-elastic clipping element 72.

Figure 5B:
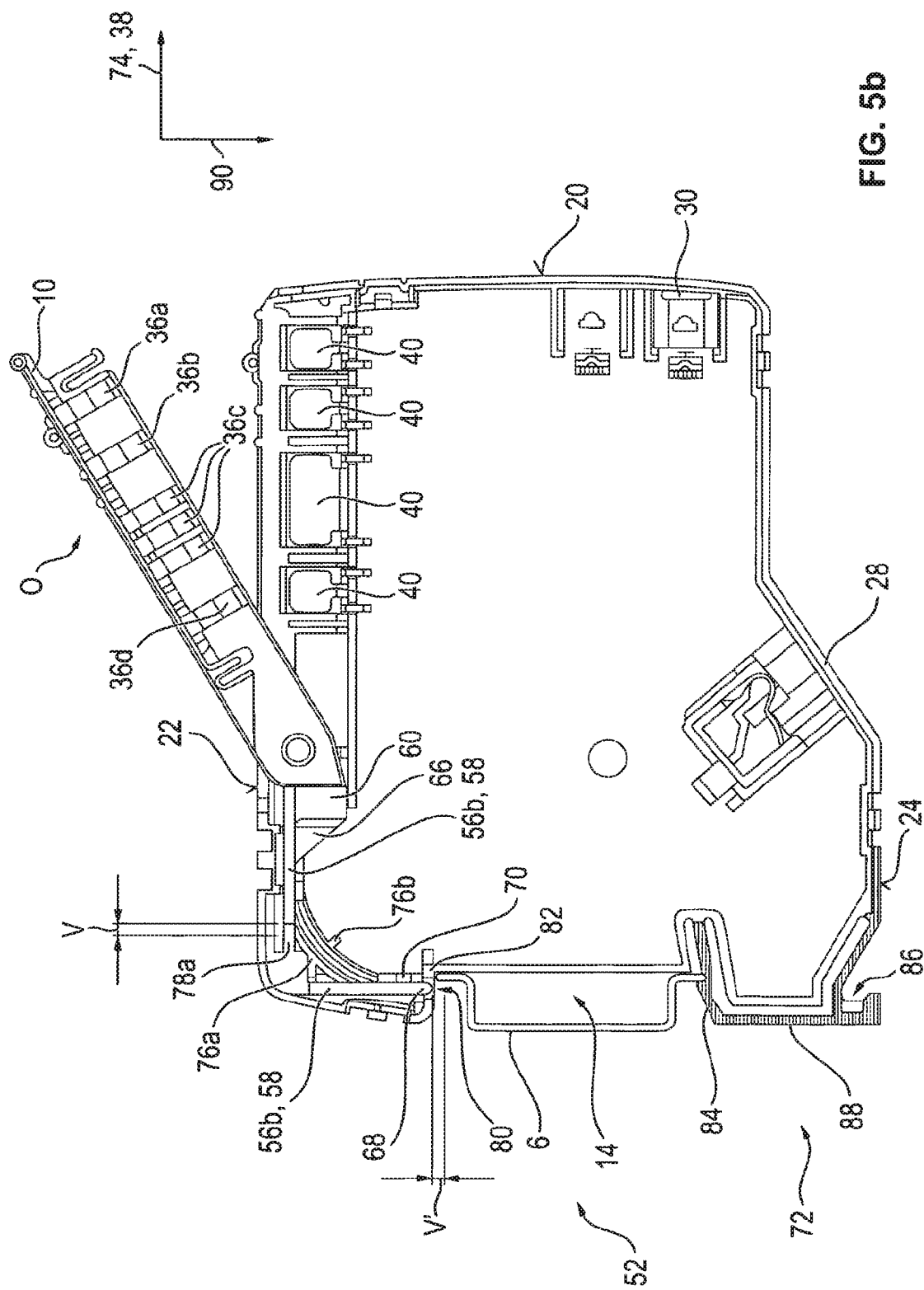

As shown in FIGS. 5a and 5b comparatively clearly, the rotational axis 26 is arranged on the top 22, spaced at a distance from the carrier rail 6 with respect to a mounting direction 74. The mounting direction 74 is oriented parallel to the transverse direction 38 and thus extends substantially perpendicular to the carrier rail 6. In the embodiment, the axis of rotation 26 is arranged offset by about one third of the top length from the plane of the carrier rails bars 6 towards the front side 20 along the mounting direction 74. This way, the deflection element 50 is disposed in the upper rear corner region of the housing 8.

Two arc-shaped inner walls 76a, 76b of the housing 8 are arranged in this corner region, in which the leaf spring element 54 rests moveable in a sliding manner. Between the housing rear side 12 and the housing-side inner wall 76a, i.e., between the housing top 22 and the inner wall 76a, a respective groove-like intermediate region 78a, 78b is formed as a linear bearing for vertical U-legs 58 of the guide extensions 56a and 56b.

The housing 8 has a housing slot 80 in the region of the receptacle 14, through which the slide element 68 is slidable out from the housing 8 into the housing rear-side region of the carrier rail 6. The stopper element 70 in this case delimits a corresponding displacement path V' of the slide element 68—as can be seen in FIG. 5a—by abutment on a housing wall 82 associated with the housing slot 80.

As shown in FIG. 5a, in the engaging position S, the slide element 68 at the cover 10 is shifted in such a manner into the region of the rear receptacle 14 that it interlockingly engages behind the carrier rail 6 on a carrier rail end face. The clipping element 72 is disposed on the opposite carrier rail end face.

The clipping element 72 provided with a hatch in FIGS. 5a and 5b includes a rear-engagement element 84 that is integrally formed on the housing 8, which is force-lockingly engaged with the carrier rail 6 as a counter bearing. That is, in the area of the receptacle 14, the carrier rail 6 is encompassed or engaged from behind by the two carrier rail end faces.

To release the force-locking connection, the clipping element 72 has a housing recess 84 in the region of the underside 24, which is operatively connected with the rear-engagement element 84. The housing recess 86 can be actuated, for example, by using a screwdriver, that means that a side wall 88 of the housing recess 86 can be bent in such a manner that the rear-engagement element 84 is pivoted to a position releasing the force fit.

To mount the switching device 4 on the carrier rail 6, the switching device 4 is snapped on the carrier rail 6 with the clipping element 72, in the mounting direction 74 and with an opened cover 10—i.e., a cover that is positioned in the disengaging position O (FIG. 5b).

Subsequently, the cover 10 is pivoted to the engaging position S. When the cover 10 is closed along a pivoting direction 90 (from the disengaging position O to the engaging position S), the guide pin 48 is pivoted arc-segment-like to the housing rear side 12, that is, the guide pin 48 is moved in the mounting direction 74 by a displacement path v. The guide pin 48 thereby presses against the walls of the profile chamber 60 so that the guide extension 56a is shifted along the intermediate region 78a and the mounting direction 74.

The elastic leaf spring element 54 avoids being loaded by the guide extension 56a by slipping or sliding along the inner walls 76a, 76b, whereby the slide element 68 is pushed to the stop of the stopper element 70 by the displacement path V, out from the housing 8 into an interlocking locking position in the region of the carrier rail 6. The deflection element 50 thus acts in the manner of a swivel-sliding joint which converts the pivoting movement from the disengaging position O to the engaging position S into a linear displacement of the slide element 68.

For dismounting, first the frictional connection of the clipping element 72 is released by means of actuation of the housing recess 86, and then the form fit of the slide element 68 is unlocked by opening the cover 10 into the disengaging position O. As a result, the switching device 4 can be released from the carrier rail 6 substantially perpendicular to the carrier rail 6, that is, along the (dis) mounting direction 74.

It is essential that on the one hand, the cover 10 allows for an opening and closing of the contact connection between the switching devices 4, and on the other hand, a substantially simultaneous actuation of the securing device 52 takes place. In particular, a mounting or dismounting direction 74 of the switching device 4 oriented substantially perpendicular or perpendicular to the carrier rail 6 is desirable, which is particularly advantageous in crowded mounting situations such as in a switch cabinet, in particular in the context of the current distributor 2. Furthermore, the design of the deflection element 50 in the manner of a sliding swivel joint allows for a structurally simple, inexpensive and long-lasting swivel mechanism, by means of which the switching device 4 can be easily releasably attached to the carrier rail 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A switching device comprising:
   a housing with a cover that is pivotable about a rotational axis, the cover having at least one coupling contact on a side facing an inner side of the housing for electrical and/or signal-type contact connection;
   a securing device for direct mounting on a carrier rail, the securing device comprising a spring-elastic clipping element integrally formed on the housing for force-locking securing to a carrier rail end face, and a slide element coupled to the cover and mounted linearly slidable inside the housing for interlocking securing to the carrier rail end face that sits opposite the clipping element;
   at least one adjacent switching device that is adapted to be arranged in series at an end face of the housing; and
   a spring-elastic deflection element configured to convert a pivoting movement of the cover into a linear movement of the slide element to lock or unlock the securing device,
   wherein, upon pivoting the cover, the contact connection is opened or closed.

2. The switching device according to claim 1, wherein the clipping element is coupled with an actuatable housing recess, and wherein the force-locking securing to the carrier rail end face is releasable via the housing recess.

3. The switching device according to claim 1, wherein the at least one coupling contact comprises two-legged spring contacts.

4. The switching device according to claim 3, further comprising at least one internal counter contact arranged at the inner side of the housing,
   wherein one leg of the two-legged spring contacts is configured to contact the at least one internal counter contact.

5. The switching device according to claim 4, wherein the at least one internal counter contact is substantially U-shaped.

6. A switching device comprising:
   a housing with a cover that is pivotable about a rotational axis, the cover having at least one coupling contact on a side facing an inner side of the housing for electrical and/or signal-type contact connection;
   a securing device for direct mounting on a carrier rail, the securing device comprising a spring-elastic clipping element integrally formed on the housing for force-locking securing to a carrier rail end face, and a slide element coupled to the cover and mounted linearly slidable inside the housing for interlocking securing to the carrier rail end face that sits opposite the clipping element; and
   at least one adjacent switching device that is adapted to be arranged in series at an end face of the housing,
   wherein, upon pivoting the cover, the contact connection is opened or closed,
   wherein, upon pivoting the cover, the securing device is locked or unlocked, and wherein the cover is coupled with a spring-elastic deflection element at a top portion of the housing to convert a pivoting movement of the cover into a linear movement of the slide element that is transversely directed toward a pivoting direction and a carrier rail longitudinal direction.

7. The switching device according to claim 6, wherein the spring-elastic deflection element has a substantially arc-like leaf spring element, and wherein the slide element is coupled tangentially flush with the substantially arc-like leaf spring element.

8. The switching device according to claim 7, wherein, in a corner region of the housing that is assigned to the rotational axis, two arc-like and radially spaced-apart inner walls are arranged, in which the substantially arc-like leaf spring element rests slidably moveable in the region of its arc-like bulge.

9. The switching device according to claim 6, wherein the cover has a guide pin on one end of the cover which is disposed within a groove-like profile chamber of the spring-elastic deflection element.

10. The switching device according to claim 9, wherein the rotational axis of the cover is arranged between the guide pin and the at least one coupling contact.

11. The switching device according to claim 9, wherein the slide element and the profile chamber each comprise a substantially U-shaped guide extension on the substantially arc-like leaf spring element, wherein vertical U-legs of the U-shaped guide extensions are each oriented tangentially to the substantially arc-like leaf spring element, and wherein the substantially arc-like leaf spring element is connected in an inner region of horizontal U-legs.

12. The switching device according to claim 11, wherein the vertical U-legs are mounted in a linearly slidable manner between the housing and a housing-side inner wall.

13. The switching device according to claim 11, wherein the horizontal U-legs of a slide element guide extension comprises a knob-like stopper element that limits a linear movement of the slide element in a direction of the carrier rail end face by abutment on a housing wall.

14. A switching device comprising:
a housing;
a cover pivotably coupled to the housing; and
a securing device for mounting the switching device on a carrier rail, the securing device comprising:
a spring-elastic clipping element formed on the housing for force-locking to an end face of the carrier rail;
a slide element coupled to the cover, the slide element being slidably mounted inside the housing for force-locking to an opposite end face of the carrier rail; and
a spring-elastic deflection element configured to convert a pivoting movement of the cover into a linear movement of the slide element to lock or unlock the securing device.

15. A system comprising:
a plurality of switching devices, each of the plurality of switching devices comprising:
a housing;
a cover, the cover being pivotably coupled to the housing and having at least one coupling contact configured to electrically connect two adjacent switching devices; and
a securing device for mounting said each of the plurality of switching devices on a carrier rail, the securing device comprising:
a spring-elastic clipping element formed on the housing for force-locking to an end face of the carrier rail;
a slide element coupled to the cover, the slide element being slidably mounted inside the housing for force-locking to an opposite end face of the carrier rail; and
a spring-elastic deflection element configured to convert a pivoting movement of the cover into a linear movement of the slide element to lock or unlock the securing device.

\* \* \* \* \*